Jan. 23, 1951 T. D. JORGENSEN 2,539,253
LITTER STIRRING AND LIME ADMIXING APPARATUS
Filed July 13, 1949 2 Sheets-Sheet 1
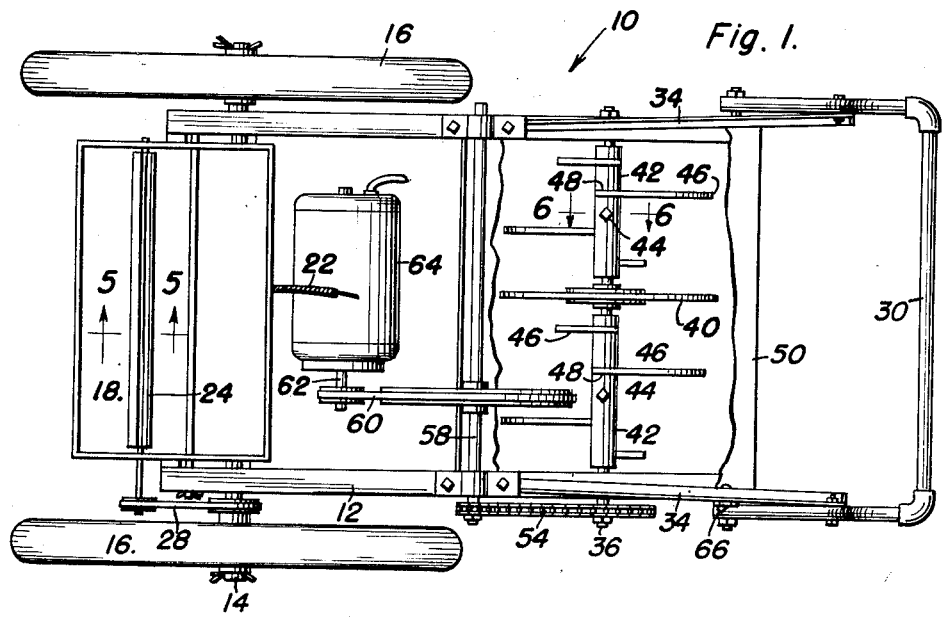
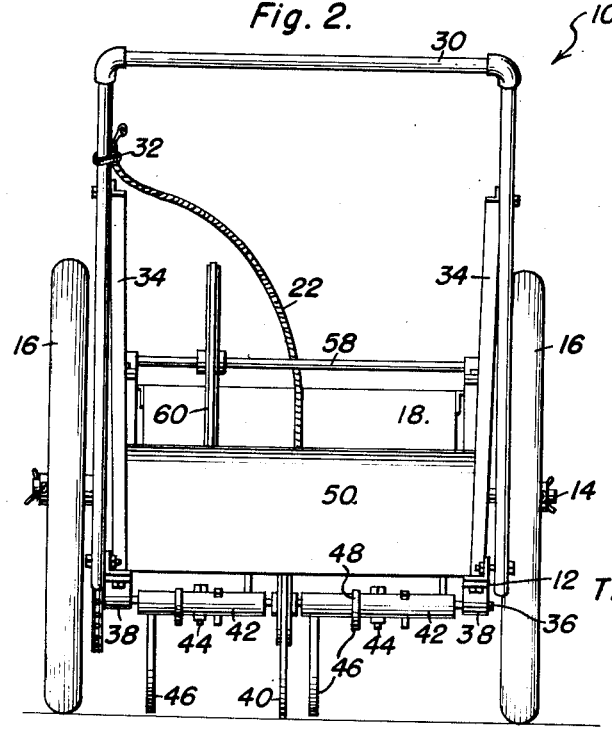
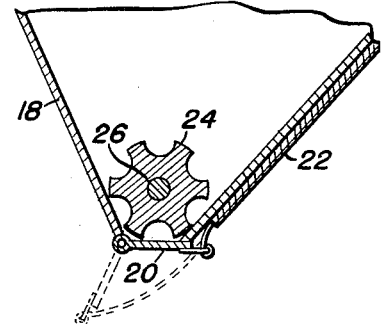
Thomas D. Jorgensen
INVENTOR.

Jan. 23, 1951
T. D. JORGENSEN
2,539,253
LITTER STIRRING AND LIME ADMIXING APPARATUS
Filed July 13, 1949
2 Sheets-Sheet 2
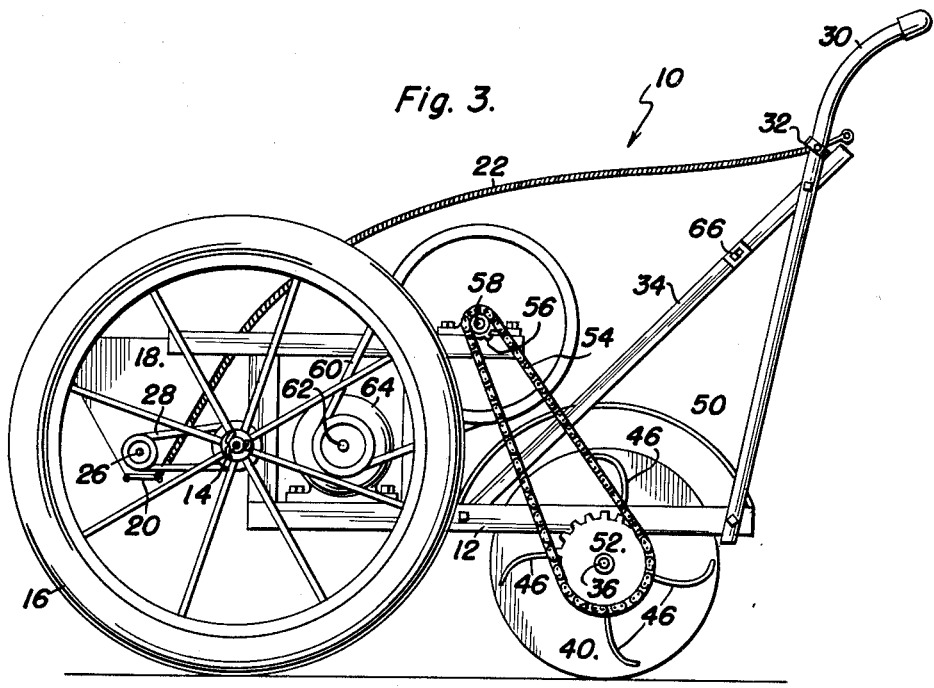
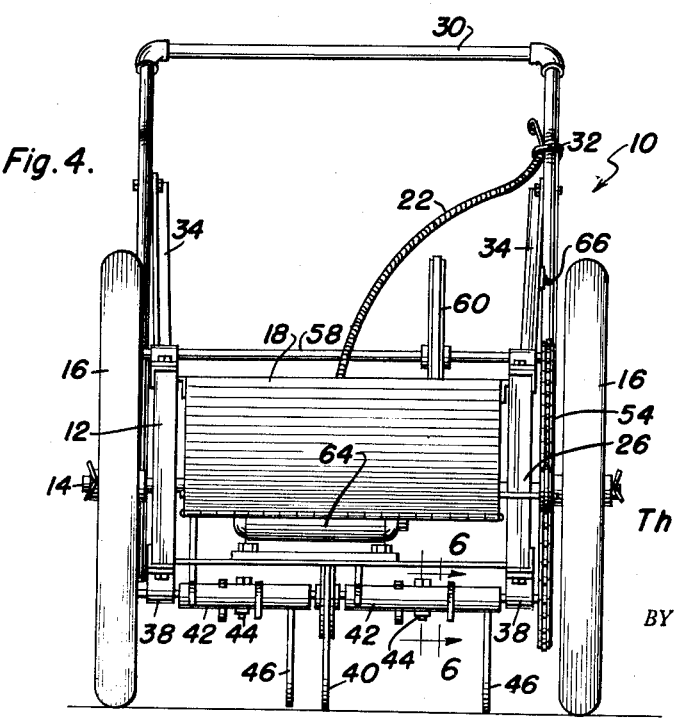
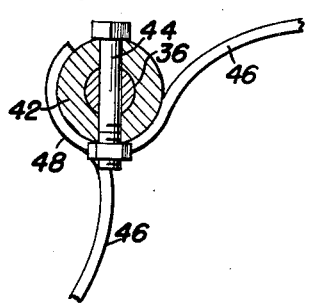
Thomas D. Jorgensen
INVENTOR.
BY
Attorneys Patented Jan. 23, 1951

2,539,253

UNITED STATES PATENT OFFICE 2,539,253

LITTER STIRRING AND LIME ADMIXING APPARATUS

Thomas D. Jorgensen, Blackfoot, Idaho

Application July 13, 1949, Serial No. 104,444

7 Claims. (Cl. 259—144)

This invention relates to new and useful improvements and structural refinements in devices for stirring litter in poultry houses and admixing lime therewith so that the dampness or humidity resulting from the presence of litter is substantially reduced.

The principal object of the invention is to provide an apparatus for performing this operation in a much more efficient and expeditious manner than it can be performed by hand or by other means, an important feature of the invention residing in the structural arrangement of the litter stirrer and lime admixer which is capable of efficient and silent operation so that poultry are not disturbed thereby.

Another feature of the invention resides in the structural arrangement of the lime distributing unit, while some of the advantages of the invention lie in its simplicity of construction, in its efficient operation, and in its adaptability to economical manufacture.

With the above more important objects and features in view, and such other objects and features as may become apparent as this specification proceeds, the invention consists essentially of the arrangement and construction of parts as illustrated in the accompanying drawings, in which:

Figure 1 is a top plan view of the invention, the same being partially broken away so as to reveal its construction;

Figure 2 is a rear elevational view of the subject shown in Figure 1;

Figure 3 is a side elevational view thereof;

Figure 4 is a front elevational view of the same;

Figure 5 is a fragmentary cross-sectional detail, taken substantially in the plane of the line 5—5 in Figure 1; and Figure 6 is a fragmentary cross-sectional view, taken substantially in the plane of the line 6—6 in Figure 1.

Like characters of reference are employed to designate like parts in the specification and throughout the several views.

Referring now to the accompanying drawings in detail, the invention consists of a litter stirring and lime admixing apparatus, this being designated generally by the reference character 10 and embodying in its construction a frame 12 having a front portion provided with a pair of bearings to accommodate a rotatable, transversely disposed axle 14 carrying a pair of traveling wheels 16.

The front end portion of the frame 12 also carries a lime distributing unit consisting of a transversely extending, downwardly tapered hopper 18 provided at its lower end with a swingable, hingably mounted outlet gate 20. The opening and closing of this gate is effected by a "Bowden" cable 22, whereby the rate of discharge of lime from the hopper may be regulated as desired.

A suitable agitator 24 is mounted upon a rotatable shaft 26 journaled in the bottom portion of the hopper 18, one end portion of the shaft 26 projecting outwardly from the hopper and being connected by a belt or chain drive 28 to the axle 14, so that as the axle 14 is rotated when the apparatus travels along the floor, the agitator 24 is subjected to rotation, thus assuring proper discharge of the lime from the hopper.

A suitable handle 30 extends upwardly and rearwardly from the rear portion of the frame 12 so that the entire apparatus may be conveniently pushed along the floor, and it will be noted that the free end portion of the control cable 22 is attached to the handle 30 as at 32, for convenient opening and closing of the hopper door or gate 20.

If desired, diagonal braces 34 may extend between the handle 30 and the intermediate portion of the frame 12, substantially as shown.

A shaft 36 is rotatably mounted in suitable bearings 38 on the rear end portion of the frame 12, this shaft extending transversely of the frame and having positioned on its intermediate portion a floor engaging wheel or disk 40 which is rotatable independently of the shaft 36.

A pair of tubular sleeves 42 are secured by transversely extending bolts 44 to the shaft 36 at the sides of the disk or wheel 40, and a plurality of litter stirring and lime mixing elements, assuming the form of reversely curved straps 46, are provided with arcuate end portions 48 which are wrapped partly around the sleeves 42 and are secured thereto by welding, or the like.

It will be apparent from the foregoing that the shaft 36 together with the sleeves 42 and the elements 46 may rotate independently of the rotation of the floor engaging wheel 40, whereby the shaft, sleeve and elements may be rotated at relatively high speed for litter stirring and lime mixing purposes, while the wheel 40 turns at relatively low speed as the apparatus is pushed along the floor. It is to be noted, however, that the straps or elements 46 project outwardly from the shaft 36 to a distance lesser than the radius of the wheel 40, so that the elements 46 actually do not touch the ground or floor, but merely stir the litter thereon and mix the distributed lime therewith.

If desired, an arcuate shield 50 may be provided in a transversely extending position on the frame 12 directly over the stirring and mixing elements 46, so as to prevent the matter on the floor from being thrown on the operator of the apparatus.

Rotation of the shaft 36 is effected by means of a sprocket 52 which is secured to one end portion of the shaft 36 and is connected by an endless chain 54 to a further sprocket 56 secured to a counter-shaft 58 which, in turn, is rotatably mounted on the frame 12 and is connected by a belt drive 60 to the armature shaft 62 of an electric motor 64 which the frame 12 carries. The operation of this motor is controlled by means of a switch 66 conveniently mounted on one of the aforementioned reinforcing struts 34 adjacent the handle 30, as will be clearly apparent.

It is believed that the advantages and use of the invention will be readily understood from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. A litter stirring and lime admixing apparatus comprising a frame having front and rear portions, a pair of transversely spaced traveling wheels provided on the front portion of said frame, a material distributing unit including a hopper mounted on the front portion of the frame, a transverse shaft rotatably mounted on the rear portion of the frame, means for rotating said shaft, a floor engaging wheel positioned intermediate the ends of said shaft and rotatable independently of the latter, and a set of stirring and mixing elements secured to said shaft and projecting outwardly therefrom to a distance less than the radius of said last mentioned wheel.

2. The device as defined in claim 1 together with a rotatable agitator provided in said hopper and means operatively connecting said agitator to said travelling wheels.

3. The combination of claim 1 including a shaft rotatably mounted in said hopper, said hopper having a discharge opening therein, means on said shaft for agitating the material in the hopper and delivering measured portions thereof to said discharge opening.

4. The combination of claim 3 including driving means operatively connecting said agitator to said travelling wheels.

5. The combination of claim 1 wherein said hopper has downwardly converging side walls, the lower ends of said side walls being laterally spaced from each other, a shaft rotatably mounted in said hopper parallel to said side walls, a longitudinally fluted cylinder non-rotatably secured to said shaft, means operatively connecting said shaft to said travelling wheels to rotate said cylinder as said travelling wheels are rotated, rotation of said cylinder agitating the material in said hopper and delivering measured portions thereof to the opening between the lower end of said side walls.

6. The combination of claim 5 wherein said fluted cylinder includes fillets between said flutes, said fillets slidably engaging said side walls as said cylinder is rotated.

7. The combination of claim 6 including means for regulating the flow of material from said discharge opening.

THOMAS D. JORGENSEN.

REFERENCES CITED

The following references are of record in the file of this patent:

UNITED STATES PATENTS

| Number | Name | Date |
| --- | --- | --- |
| 348,862 | Pennal | Sept. 7, 1886 |
| 823,710 | Stockham | June 19, 1906 |
| 1,287,809 | Wilhelm | Dec. 17, 1918 |
| 1,520,916 | Townsend | Dec. 30, 1924 |
| 1,566,133 | Wadsworth | Dec. 15, 1925 |
| 2,272,715 | Lindsey | Feb. 10, 1942 |